US010742401B2

(12) United States Patent
Kaul et al.

(10) Patent No.: US 10,742,401 B2
(45) Date of Patent: Aug. 11, 2020

(54) HALF-PYRAMID DATA ENCRYPTION

(71) Applicant: International Business Machines Corporation, Armonk, NY (US)

(72) Inventors: Akshar Kaul, Bangalore (IN); Manish Kesarwani, Bangalore (IN); Sameep Mehta, New Delhi (IN); Prasad G. Naldurg, Bangalore (IN); Gagandeep Singh, Jalandhar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 15/847,181

(22) Filed: Dec. 19, 2017

(65) Prior Publication Data

US 2019/0190695 A1    Jun. 20, 2019

(51) Int. Cl.
*H04L 29/06* (2006.01)
*H04L 9/06* (2006.01)
*H04L 9/00* (2006.01)
*G09C 1/00* (2006.01)
*G06F 21/62* (2013.01)

(52) U.S. Cl.
CPC .......... *H04L 9/065* (2013.01); *G06F 21/6227* (2013.01); *G09C 1/00* (2013.01); *H04L 9/008* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 8,626,749 | B1* | 1/2014 | Trepetin | H04L 9/002 707/722 |
| 2013/0067226 | A1* | 3/2013 | Kunde | H04L 9/0894 713/168 |
| 2015/0154418 | A1* | 6/2015 | Redberg | G06F 21/602 713/165 |
| 2015/0188890 | A1* | 7/2015 | Said | H04L 63/0428 713/168 |
| 2016/0112190 | A1 | 4/2016 | Aissi et al. | |
| 2017/0063525 | A1* | 3/2017 | Bacon | H04L 9/008 |

(Continued)

OTHER PUBLICATIONS

Hu, Changhui et al., "Efficient wildcard search over encrypted data", International Journal of Information Security, Oct. 2016, 9 Pages, vol. 15, Issue 5, Springer-Verlag, Berlin, Heidelberg.

(Continued)

*Primary Examiner* — Shin-Hon (Eric) Chen
(74) *Attorney, Agent, or Firm* — Ference & Associates LLC

(57) ABSTRACT

One embodiment provides a method, including: receiving, from a data owner, an input string of plaintext data comprising a plurality of characters for storage in a database of a third-party storage provider; arranging the plurality of characters of the input string as a half pyramid, wherein the half pyramid comprises a plurality of rows, each row comprising at least one more character than a preceding row; encrypting, using a secure encryption scheme and based upon a key, each row of the half pyramid independently from each other row of the half pyramid; and storing, in the database of the third-party storage provider, the encrypted rows of the half pyramid. Other aspects are claimed and described.

14 Claims, 4 Drawing Sheets

(56) References Cited

U.S. PATENT DOCUMENTS

2017/0078251 A1* 3/2017 Grubbs .................. G06F 16/951
2018/0115625 A1* 4/2018 Livneh ................. G06F 21/6254
2018/0145826 A1* 5/2018 Greatwood ........... G06F 3/0667
2019/0036679 A1* 1/2019 Hirano ..................... G09C 1/00

OTHER PUBLICATIONS

Bosch, Christoph et al., "Conjunctive Wildcard Search over Encrypted Data", SDM '11, Proceedings of the 8th VLDB International Conference on Secure Data Management, Seattle, WA, Sep. 2, 2011, 15 Pages, Springer-Verlag, Berlin, Heidelberg.

* cited by examiner

| Index | Value |
|---|---|
| 1 | Encypt(k,5) |
| 2 | Encypt(k,56) |
| 3 | Encypt(k,560) |
| 4 | Encypt(k,5600) |
| 5 | Encypt(k,56001) |
| 6 | Encypt(k,560012) |

HALF-PYRAMID DATA ENCRYPTION

BACKGROUND

Digital data are created and stored at many different enterprises. Storing and managing data requires physical storage space to store the data. Additionally, the storage and management of the data require software to organize, access, and otherwise manage the data. Typically, it is the data owner, the enterprise that is capturing and/or storing the data, who is responsible for the storage and management of the data. However, the storage and management of the data can be very expensive. The costs increase as the volume of data that needs to be stored and managed increases.

Thus, some data owners may outsource the storage and management of data to a third-party, for example, a third-party database service provider. Many of these third-party database service providers are cloud service providers that are accessible over an Internet connection. Such a model allows both client devices and the data owner to access the data in the third-party database service provider. This model eliminates the need for the data owner to purchase and manage expensive hardware and software to store and manage the data.

BRIEF SUMMARY

In summary, one aspect of the invention provides a method, comprising: utilizing at least one processor to execute computer code that performs the steps of: receiving, from a client device, an input string of plaintext data comprising a plurality of characters for storage in a database of a third-party storage provider; arranging the plurality of characters of the input string as a half pyramid, wherein the half pyramid comprises a plurality of rows, each row comprising at least one more character than a preceding row; encrypting, using a secure encryption scheme and based upon a key, each row of the half pyramid independently from each other row of the half pyramid; and storing, in the database of the third-party storage provider, the encrypted rows of the half pyramid.

Another aspect of the invention provides an apparatus, comprising: at least one processor; and a computer readable storage medium having computer readable program code embodied therewith and executable by the at least one processor, the computer readable program code comprising: computer readable program code configured to receive, from a data owner, an input string of plaintext data comprising a plurality of characters for storage in a database of a third-party storage provider; computer readable program code configured to arrange the plurality of characters of the input string as a half pyramid, wherein the half pyramid comprises a plurality of rows, each row comprising at least one more character than a preceding row; computer readable program code configured to encrypt, using a secure encryption scheme and based upon a key, each row of the half pyramid independently from each other row of the half pyramid; and computer readable program code configured to store, in the database of the third-party storage provider, the encrypted rows of the half pyramid.

An additional aspect of the invention provides a computer program product, comprising: a computer readable storage medium having computer readable program code embodied therewith, the computer readable program code executable by a processor and comprising: computer readable program code configured to receive, from a data owner, an input string of plaintext data comprising a plurality of characters for storage in a database of a third-party storage provider; computer readable program code configured to arrange the plurality of characters of the input string as a half pyramid, wherein the half pyramid comprises a plurality of rows, each row comprising at least one more character than a preceding row; computer readable program code configured to encrypt, using a secure encryption scheme and based upon a key, each row of the half pyramid independently from each other row of the half pyramid; and computer readable program code configured to store, in the database of the third-party storage provider, the encrypted rows of the half pyramid.

A further aspect of the invention provides a method, comprising: utilizing at least one processor to execute computer code that performs the steps of: receiving a plaintext input string of characters for storage at a third-party cloud database service provider; encrypting the input string by: arranging the characters of the input string in a half pyramid data structure, the half pyramid data structure comprising a plurality of rows each comprising at least one character and each row comprising at least one more character than a previous row; encrypting, using a data encryption scheme, each row of the half pyramid data structure separately from each other row of the half pyramid data structure; and storing, at the third-party cloud database service provider, the encrypted input string by storing the encrypted rows of the half pyramid data structure.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2A illustrates an input string arranged as a half pyramid.

FIG. 2B illustrates encrypted rows of the half pyramid.

DETAILED DESCRIPTION

Figure 1:
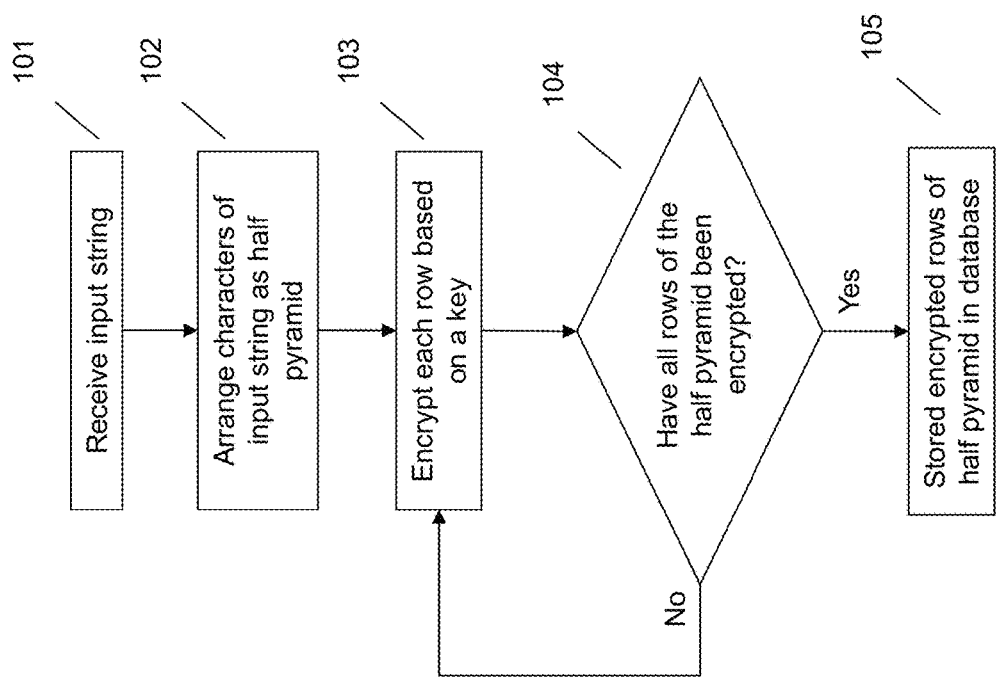
FIG. 1 illustrates a method of encrypting an input string using a half-pyramid data structure.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Third-party database service providers are very useful and helpful to data owners. Rather than having to store and manage data, the data owner can simply transfer the data to the third-party. Since the third-party is generally accessible over the Internet, both the data owner and client devices can access the data. Therefore, the third-party database service provider provides an efficient, cost-effective, and scalable data storage and management solution to data owners.

A problem with the third-party database service provider model is that the data owner no longer has control over the data. Rather than maintaining the data on-site, the data owner is now shipping the data to a database service provider. Accordingly, the issue of security of the data arises, specifically securing the data from the database service provider. Such a model is conventionally known as an honest but curious adversary model. The database service provider is honest when queries are provided to the database service provider. In other words, when data are requested from the database service provider, the database service provider provides valid answers. However, the database service provider is also curious about the data and may misuse the data for purposes other than merely storing the data.

One solution is to encrypt the data before the data are stored at the third-party. In other words, before the data owner transfers the data to the third-party, the data owner encrypts the data using a standard encryption scheme, for example, using Advanced Encryption Standard (AES). The problem with this approach is that the data cannot be queried. For example, if someone is searching for a particular data, the user will provide a query for the actual data that the user is attempting to retrieve. However, the query will not return a positive result because all of the data have been encrypted and no longer appears as the original data. Thus, searching and returning desired data are not possible with this conventional approach.

Accordingly, the techniques and systems as described herein provide a technique for encrypting the data stored at a third-party database service provider and protecting the data from the third-party database service provider. The system receives one or more input strings of plaintext data having a plurality of characters (e.g., letters, numbers, symbols, etc.), for example, data captured or requested by a data owner. In other words, the plaintext data are the data received before any encryption is performed on the data. The input string is intended to be stored in a database of a third-party storage provider.

Thus, in order to protect the data from the curious third-party storage provider, the input string is encrypted before storage at the third-party. To encrypt the data, the system arranges the plurality of characters as a half pyramid data organization structure. The half pyramid includes rows, with each row having at least one more character than the preceding row. Specifically, each row includes not only the characters of the preceding row, but also at least one more character of the input string. The rows are created until all of the characters of the input string have been organized into the half pyramid. Each row is then encrypted using a secure encryption scheme independently from each other row. The encryption is performed based upon a key known to the data owner or security agent, as discussed in more detail below. The encrypted rows of the half pyramid are then stored in the database of the third-party storage provider.

Such a system provides a technical improvement over current techniques for data encryption for storage at a third-party. The system and methods as described herein provide an encryption technique that protects the data from the third-party database service provider while still maintaining functionality, for example, queries containing wildcards. Rather than encrypting the data before sending it to the third-party and losing the ability to query the data, the system as described herein uses a half pyramid data organization technique for encryption. Each row of the half pyramid is then encrypted independently from each other row using the same encryption function and key. The encryption scheme used supports the homomorphic evaluation of equality and string concatenation operations, which allows for querying over encrypted data. The traditional encryption techniques cannot support these queries over the encrypted data. Additionally, the systems and methods allow for substring querying.

FIG. 1 illustrates a method for encrypting data for storage at a third-party database storage provider using a half pyramid data organization structure. At 101 the system receives at least one input string of plaintext data having a plurality of characters (e.g., symbols, numbers, letters, etc.) to be stored in a database of a third-party storage provider. Plaintext data are the data before it is encrypted or otherwise manipulated for storage at the third-party storage provider. The input string may include a few characters, a single word, a phrase, table information, or the like. In other words, the input string may include any type and size of data or information. The input string may also include more than one string of input data for storage at the third-party storage provider.

The third-party storage provider is an honest but curious adversary who may attempt to use the data for some purpose other than storage and management of the data. In other words, the third-party storage provider may try to learn things from the data, even though the third-party storage provider is only supposed to store and manage the data, making it an adversary. However, the third-party storage provider provides valid answers to any queries, thereby making it an honest adversary. Thus, the systems and methods as described herein are intended to protect the data from the third-party storage provider, which will also be referred to herein as "third-party" for readability.

The input string(s) may be received from a client of the data owner. The client may be a device or user requesting that the data owner store information for the client. In other words, the data owner may be storing information on behalf of the client. The client may also be a client of the data owner and the data may be information captured by the data owner during interactions with the client. In other words, the data owner may be the creator of the input string. Receiving the input string may include receiving or otherwise obtaining the data directly from the client, creating the data at the data owner, accessing the data from a data storage location, or the like.

To begin the encryption of the plaintext data, the system may arrange the plurality of characters as a half pyramid data organization structure at 102. A half pyramid data organization structure includes characters arranged in a plurality of rows with each row having at least one more character than a preceding row. Specifically, each row includes the characters of the preceding row and at least one additional character of the input string. For example, FIG. 2A illustrates a half pyramid data organization structure for the input string 560012. In the example of FIG. 2A, each row includes one more character of the preceding row, for example, row 1 includes the first character of the input string specifically "5", row 2 includes the first character and an additional character of the input string specifically "56", and so on.

The rows of the half pyramid may be of any granularity, meaning the number of characters included and added at each row may be of any number.

Additionally, traversing from one row to the next row does not have to include the same number of added characters as traversing from a different row to the next row. For example, row 1 may include a single character, row 2 may include three characters, row 3 may include four characters, and the like. The granularity for each row must be known to the system. Additionally, for each input string the granularity for each row must be the same for each input string to be stored.

At 103 the system may encrypt each row of the half pyramid. Each row of the half pyramid is encrypted independently or separately from each other row using the same encryption function and the same key. In other words, each row is encrypted and each encrypted row will be stored separately in the third-party. The encryption will be done using a secure encryption scheme, for example, a partially homomorphic encryption scheme. Traditional partially homomorphic encryption schemes support some operators, for example, adding operators. However, typical partially homomorphic encryption schemes do not support all operators that will be supported by the systems and methods as described herein. These additional operators will be described in more detail below.

The encryption of each row is based upon a key known to the entity encrypting the data, for example, the data owner or security agent, as explained in more detail below. The key used for the encryption is the same key, or the same cryptographic scheme, for each row. This encryption converts the plaintext data into a ciphertext that is meaningless without the key. Thus, the third-party will be unable to misuse the data because it has been converted to ciphertexts. At 104 the system determines if all the rows of the half pyramid have been encrypted. If not all rows have been encrypted, the system continues to encrypt rows at 103 until all the rows have been encrypted.

If all the rows have been encrypted at 104, the system then stores the encrypted rows of the half pyramid in the database of the third-party at 105, for example, by sending the encrypted rows to the third-party. An example of the rows stored in the database is shown in FIG. 2B, where the encrypted values are stored in the table column of value 203. The table also includes an index number for each of the encrypted values in the index column 202. The table may be organized in any manner or having different columns. The table may also include more columns.

By encrypting and storing the data as rows of a half pyramid, the systems and methods as described herein provide additional functionality, specifically, the ability to query the data and receive accurate query results. For example, the described encryption technique supports equality and string concatenation operators, thereby supporting, during querying, a secure LIKE operator search. Equality allows the system to identify if two ciphertexts are the same. String concatenation allows concatenation of an existing ciphertext with a new ciphertext to get an updated ciphertext without revealing the identity of the existing ciphertext and the new ciphertext.

Figure 3:
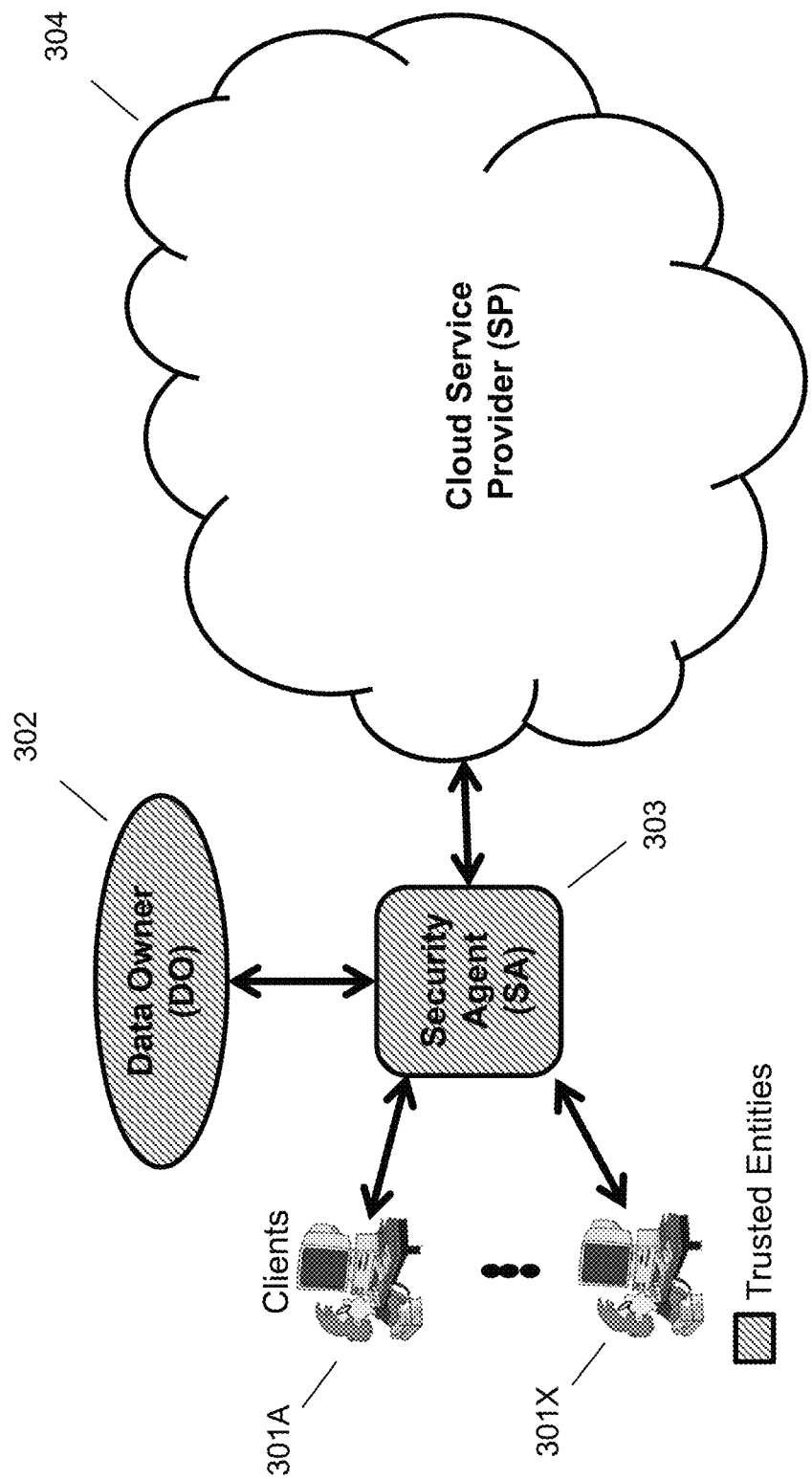
FIG. 3 illustrates an example interaction between a client, data owner, security agent, and cloud service provider.

FIG. 3 illustrates an overall example of the interaction and roles of each of the entities within the system. The clients 301A-301X are the entities having the information to be stored or requested by the data owner 302. The security agent 303 is the interface between the client 301A-301X and the data owner 302, the data owner 302 and the cloud service provider 304, and/or the client 301A-301X and the cloud service provider 304. The security agent 303 can be realized using a secure co-processor at the cloud service provider or at the data owner. The data owner 302 and the security agent 303 are trusted, while the cloud service provider 304 is an honest-but-curious adversary. The cloud service provider 304 stores the encrypted data and correctly responds to client queries while following all steps of a defined protocol. However, the cloud service provider 304 is interested in learning the plaintext of the encrypted data, thereby making the cloud service provider 304 an honest-but-curious adversary.

The data owner 302 generates the encryption keys and encrypts the sensitive database or information using the techniques described herein. The data owner 302 then sends the encrypted database to the cloud service provider 304 for maintenance and storage. The data owner 302 additionally sends the encryption keys to the security agent 303 so that the security agent 303 can encrypt queries provided by clients 301A-301X before sending to the cloud storage provider 304. Additionally, the security agent 303 decrypts information received from the cloud service provider 304 before returning a plaintext result to the requesting client 301A-301X. Alternatively, rather than the data owner 302 encrypting the data and then sending the encryption keys to the security agent 303, the data owner may send the unencrypted data to the security agent 303 for encryption by the security agent 303 before being sent to the cloud storage provider 304.

A query may be received at the security agent 303 and may contain at least one plaintext character identifying a search request for one or more plaintext characters corresponding to one or more stored input strings. In other words, the query includes a search request for data stored at the third-party. However, the query includes plaintext characters, not the ciphertexts that are stored at the third-party. Accordingly, the security agent 303 encrypts the query using the same key that was used to encrypt the input strings, thereby creating a query ciphertext. The query ciphertext can then be sent to the cloud storage provider 304. The cloud storage provider 304 may then compare the query ciphertext against the stored ciphertexts at the cloud storage provider 304 to find a matching ciphertext. If one or more matching ciphertexts are found in the database of the third-party, the matching ciphertexts are sent to the security agent 303. The security agent 303 then decrypts the ciphertexts using the known key and returns the plaintext characters corresponding to the plaintext query to the requesting client 301A-301X.

The systems and methods as described herein also support queries that include one or more wildcard characters. Wildcard characters are placeholders used to represent one or more characters. In other words, wildcard characters can be used to identify that any character(s) can be found in the wildcard placeholder. Common wildcard characters include the symbol "?" that corresponds to a single character placeholder and the symbol "*" that corresponds to zero or more character placeholders. To find entries that match the query having zero or more wildcard characters, the system, for example, the security agent 303, encrypts the portion of the query preceding the wildcard character. The search function identifies the encrypted portion of the query preceding the wildcard character, the query portion length, and the query portion location within the query. For example, if the query has three characters preceding the wildcard character, the system encrypts the three characters. As an example, if the query string is "560?12" the system encrypts "560" separately from the remaining characters. The search function then uses the encrypted three characters and identifies the encrypted character string length and location within the query set.

The system, for example, the security agent 303, encrypts the portion of the query subsequent to the at least one wildcard character, using the example above, "12". The search function identifies the encrypted portion of the query subsequent to the wildcard character, the query portion length, and the query portion location within the query. For example, if the query has two characters subsequent to the wildcard character, the system encrypts the two characters. The search function then uses the encrypted two characters and identifies the encrypted character string length and location within the query set. The search function then concatenates the first portion and the second portion while identifying the location within the query to perform the query within the database. Using the example identified above, the search function may look like:

(Value(3)==560) & (strcat(Value(4),12)==Value(6)) & strlen(Input string)=6

As another example, if the query string is 56*2, the search function may look like:

(Value(2)==56) & (strcat(Value(j−1),2)==Value(j)) where j=strlen(Input string)

The search function is then sent to the third-party for determining if any stored input strings match the encrypted query input string. If any matches are found, the third-party returns the matching ciphertexts to the security agent 303. The security agent 303 then decrypts the returned matching ciphertexts and returns the plaintext characters matching the query request to the requesting client.

The query may also include a substring of plaintext characters. In other words, the query does not need to correspond to an entire input string. For example, the query may include a middle portion of an input string. With a substring query the system incorporates wildcard characters as placeholders for any characters before or after the substring of plaintext characters, as described above. For example, if the query string is *0?2* the search function may look like:

```
for i = 1 to strlen(input string)
{
    if (strcat(value(i),0)) = = Value(i+1) && (strcat(value(i+2,2) = = value(i+3))
    {
        Return current ciphertext as one of the answer
    }
}
```

Even with a substring of plaintext characters, the systems and methods as described herein can still return accurate query results.

Figure 4:
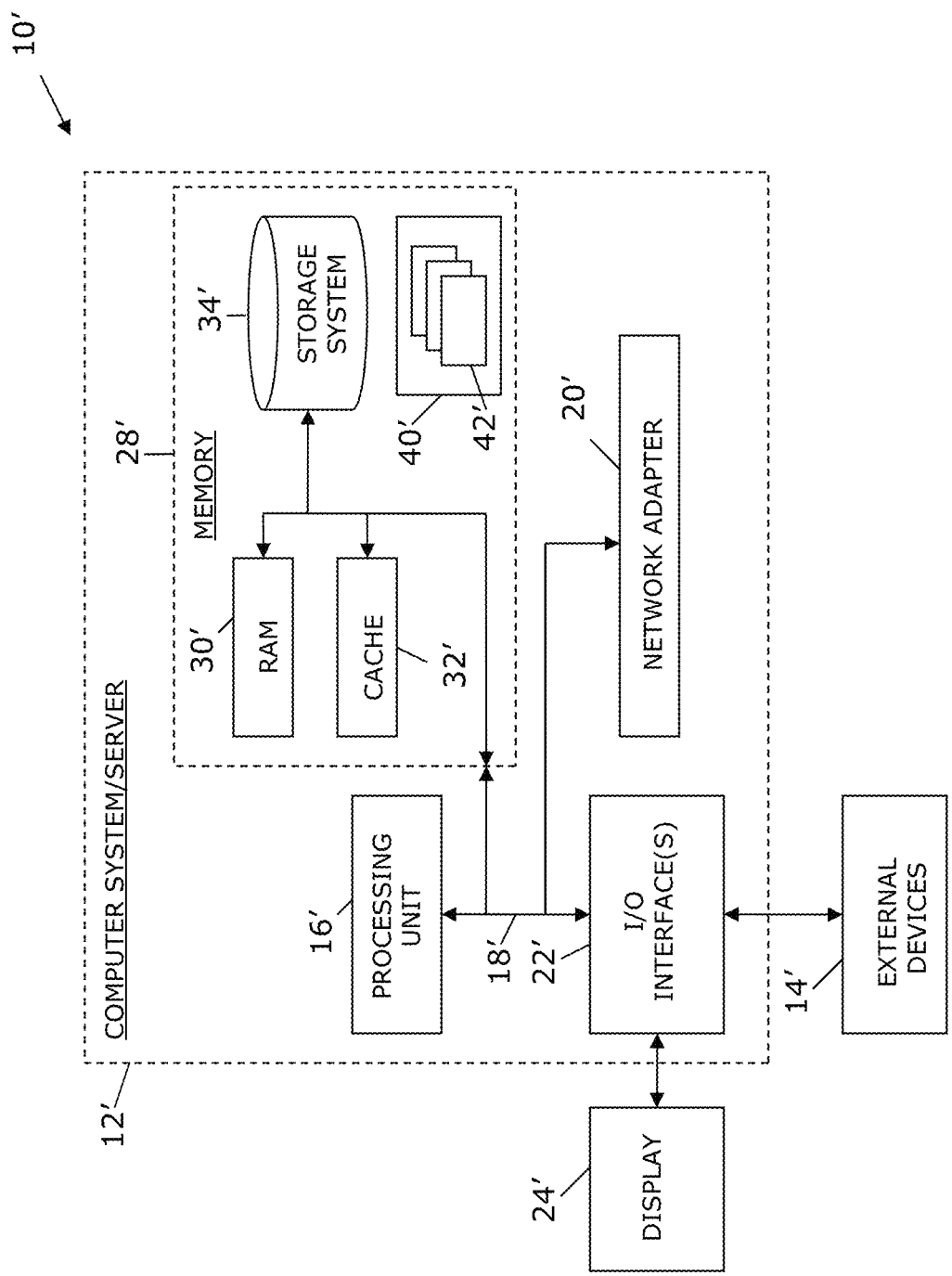
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving, from a data owner, an input string of plaintext data comprising a plurality of characters for storage in a database of a third-party storage provider;
arranging the plurality of characters of the input string as a half pyramid, wherein the half pyramid comprises a plurality of rows, each row comprising at least one more character than a preceding row;
encrypting, using a secure encryption scheme and based upon a key that is known to the data owner and unknown to the third-party storage provider, each row of the half pyramid independently from each other row of the half pyramid;
storing, in the database of the third-party storage provider, the encrypted rows of the half pyramid;
receiving a query comprising at least one plaintext character and at least one wildcard character:
encrypting, based on the key, the portion of the query preceding the at least one wildcard character and separately encrypting, based on the key, the portion of the query subsequent to the at least one wildcard character, wherein the third-party storage provider provides a response to the query without access to the key by receiving an encrypted version of the query and utilizing the encrypted version of the query to execute a query against the encrypted rows of the half pyramid using query operators supported via the encryption of the input string being performed for each row of the half pyramid comprising, wherein to execute a query comprises searching the stored encrypted rows of the database using (i) the encrypted portion of the query preceding the at least one wildcard character and (ii) the encrypted portion of the query subsequent to the at least one wildcard character.

2. The method of claim 1, wherein the query is a search request for plaintext characters corresponding to one or more stored input strings.

3. The method of claim 2, wherein the query comprises a substring of plaintext characters.

4. The method of claim 1, comprising (i) encrypting, based on the key, the query and (ii) searching the stored encrypted rows of the database using the encrypted query.

5. The method of claim 4, comprising, if at least one encrypted row matches the query, returning the at least one encrypted row and decrypting, based on the key, the returned at least one encrypted row to return a string of plaintext characters matching the query.

6. The method of claim 1, wherein the third-party storage provider comprises an honest but curious adversary model.

7. The method of claim 1, wherein the secure encryption scheme comprises a partially homomorphic encryption scheme.

8. An a pparatus, comprising:
at least one processor; and
a computer readable storage medium having computer readable program code embodied therewith and executable by the at least one processor, the computer readable program code comprising:
computer readable program code configured to receive, from a data owner, an input string of plaintext data comprising a plurality of characters for storage in a database of a third-party storage provider;
computer readable program code configured to arrange the plurality of characters of the input string as a half pyramid, wherein the half pyramid comprises a plurality of rows, each row comprising at least one more character than a preceding row;
computer readable program code configured to encrypt, using a secure encryption scheme and based upon a key that is known to the data owner and unknown to the third-party storage provider, each row of the half pyramid independently from each other row of the half pyramid; and
computer readable program code configured to store, in the database of the third-party storage provider, the encrypted rows of the half pyramid;
computer readable program code configured to receive a query comprising at least one plaintext character and at least one wildcard character;
computer readable program code configured to encrypt, based on the key, the portion of the query preceding the at least one wildcard character and separately encrypting, based on the key, the portion of the query subsequent to the at least one wildcard character, wherein the third-party storage provider provides a response to the query without access to the key by receiving an encrypted version of the query and utilizing the encrypted version of the query to execute a query against the encrypted rows of the half pyramid using query operators supported via the encryption of the input string being performed for each row of the half pyramid comprising, wherein to execute a query comprises searching the stored encrypted rows of the database using (i) the encrypted portion of the query preceding the at least one wildcard character and (ii) the encrypted portion of the query subsequent to the at least one wildcard character.

9. A computer program product, comprising:

a computer readable storage medium having computer readable program code embodied therewith, the computer readable program code executable by a processor and comprising:

computer readable program code configured to receive, from a data owner, an input string of plaintext data comprising a plurality of characters for storage in a database of a third-party storage provider;

computer readable program code configured to arrange the plurality of characters of the input string as a half pyramid, wherein the half pyramid comprises a plurality of rows, each row comprising at least one more character than a preceding row;

computer readable program code configured to encrypt, using a secure encryption scheme and based upon a key that is known to the data owner and unknown to the third-party storage provider, each row of the half pyramid independently from each other row of the half pyramid; and computer readable program code configured to store, in the database of the third-party storage provider, the encrypted rows of the half pyramid;

computer readable program code configured to receive a query comprising at least one plaintext character and at least one wildcard character;

computer readable program code configured to encrypt, based on the key, the portion of the query preceding the at least one wildcard character and separately encrypting, based on the key, the portion of the query subsequent to the at least one wildcard character, wherein the third-party storage provider provides a response to the query without access to the key by receiving an encrypted version of the query and utilizing the encrypted version of the query to execute a query against the encrypted rows of the half pyramid using query operators supported via the encryption of the input string being performed for each row of the half pyramid comprising, wherein to execute a query comprises searching the stored encrypted rows of the database using (i) the encrypted portion of the query preceding the at least one wildcard character and (ii) the encrypted portion of the query subsequent to the at least one wildcard character.

10. The computer program product of claim 9, wherein the query is a search request for plaintext characters corresponding to one or more stored input strings.

11. The computer program product of claim 9, comprising (i) encrypting, based on the key, the query and (ii) searching the stored encrypted rows of the database using the encrypted query.

12. The computer program product of claim 11, comprising, if at least one encrypted row matches the query, returning the at least one encrypted row and decrypting, based on the key, the returned at least one encrypted row to return a string of plaintext characters matching the query.

13. The computer program product of claim 10, wherein the query comprises a substring of plaintext characters.

14. A method, comprising:

utilizing at least one processor to execute computer code that performs the steps of:

receiving a plaintext input string of charactersfor storage at a third-party cloud database service provider;

encrypting the input string by:

arranging the characters of the input string in a half pyramid data structure, the half pyramid data structure comprising a plurality of rows each comprising at least one character and each row comprising at least one more character than a previous row;

encrypting, using a data encryption scheme and a key that is unknown tothe third-party cloud database service provider, each row of the half pyramid data structure separately from each other row of the half pyramid data structure; and storing, at the third-party cloud database service provider, the encrypted input string by storing the encrypted rows of the half pyramid data structure;

receiving a query comprising at least one plaintext character and at least one wildcard character;

encrypting, based on the key, the portion of the query preceding the at least one wildcard character and separately encrypting, based on the key, the portion of the query subsequent to the at least one wildcard character, wherein the third-party cloud database service provider provides a response to a query without access to the key by receiving an encrypted version of the query and utilizing the encrypted version of the query to execute a query against the encrypted rows of the half pyramid using query operators supported via the encryption of the input string being performed for each row of the half pyramid, wherein to execute a query comprises searching the stored encrypted rows of the half pyramid data structure using (i) the encrypted portion of the query preceding the at least one wildcard character and (ii) the encrypted portion of the query subsequent to the at least one wildcard character.

\* \* \* \* \*